United States Patent [19]

McMahon

[11] Patent Number: 5,501,741

[45] Date of Patent: Mar. 26, 1996

[54] PROCESS FOR PURIFYING AQUEOUS RINSE SOLUTIONS USED IN METAL FORMING OPERATIONS

[75] Inventor: Kelly R. McMahon, Antioch, Calif.

[73] Assignee: USS-POSCO, Pittsburg, Calif.

[21] Appl. No.: 179,740

[22] Filed: Jan. 11, 1994

[51] Int. Cl.$^6$ ........................................... B08B 7/04
[52] U.S. Cl. ........................ 134/13; 134/10; 134/110; 210/641; 210/651; 210/774; 210/737; 210/781
[58] Field of Search ........................ 134/10, 13, 109, 134/110; 210/781, 651, 641, 708, 799, 737, 774

[56] References Cited

U.S. PATENT DOCUMENTS

| | | | |
|---|---|---|---|
| 2,800,493 | 7/1957 | Stein et al. | 554/187 |
| 3,000,766 | 9/1961 | Wainer | 134/10 |
| 3,025,190 | 3/1962 | Groom | 134/10 |
| 3,568,834 | 3/1971 | Treat | 134/10 |
| 3,950,371 | 4/1976 | Jeromin et al. | 554/184 |
| 4,027,685 | 6/1977 | Heard et al. | 210/708 |
| 4,436,643 | 3/1984 | Burger et al. | 134/10 |
| 4,545,940 | 10/1985 | Mutoh et al. | 554/211 |
| 4,569,796 | 2/1986 | De Laat et al. | 554/203 |
| 4,990,695 | 2/1991 | Buenemann et al. | 568/869 |
| 5,032,515 | 7/1991 | Tanigaki et al. | 435/134 |
| 5,227,071 | 7/1993 | Torline et al. | 210/651 |

OTHER PUBLICATIONS

Handbook of Separation Techniques for Chemical Engineers ©1979 by McGraw–Hill, pp. 2–5, 2–6 & 2–7.

Hawley's Condensed Chemical Dictionary 11th Edition ©1987 by Van Nostrand Reinhold, pp. 507–508 & 1118.

Primary Examiner—Robert A. Dawson
Assistant Examiner—Robert James Popovics
Attorney, Agent, or Firm—Morrison & Foerster

[57] ABSTRACT

This is a procedure for purifying rinse solutions used in operations for the shaping of metal. In particular, it is a procedure for removing fatty acids from caustic wash solutions used to rinse metal parts containing various lubricants, particularly tallow lubricants.

10 Claims, 1 Drawing Sheet

PROCESS FOR PURIFYING AQUEOUS RINSE SOLUTIONS USED IN METAL FORMING OPERATIONS

FIELD OF THE INVENTION

This invention is to a procedure for purifying rinse solutions used in operations for the shaping of metal. In particular, it is a procedure for removing fatty acids and oils from caustic wash solutions.

BACKGROUND OF THE INVENTION

Metal products manufactured from strip steel and aluminum are used in a wide variety of consumer and commercial products. Consumer products such as refrigerators and automobiles are made from thin steel plate. Airplanes and beverage cans are made from thin aluminum or steel plate. Sheet copper is used in a variety of structural and electronic services. Each of these sheet metal materials is made into sheet form by the procedure of rolling an ingot of the metal and heat treating the rolled ingot to anneal the material and soften it for further hot or cold rolling. This sequence of rolling and annealing takes place a number of times until the plate is appropriately thin for the chosen use.

The rolling steps typically use a lubricant to prevent tearing or marring of the sheet during the rolling step. One lubricant widely used in the cold-rolling of sheet steel to produce steel strip is sheep tallow. Sheep tallow is inexpensive, easy to recycle, and stable during the rolling step and various recycling procedures. The use of such organic lubricants, however, requires that they be removed from the metal plate surfaces prior to any following process steps, such as annealing, pickling, or plating. If the lubricant remains on the metal during the following step a variety of undesirable things may occur. For instance, during annealing, carbides may be created on the surface of the plate or discoloration of the plate may be caused by combustion of the lubricant. In any case, the cost of losing some amount of lubricant by combustion occurs. One way of minimizing the amount of lubricant lost to the following steps is by the use of an alkaline wash.

The alkaline wash waters are not to be discarded. They contain significant amounts of the lubricant which, via the use of proper separation procedures, may be recycled to the rolling step. The wash waters obviously work better as rinse waters when they are free of the material which they are to remove from the rolled metal surfaces. To maintain the rinse waters at an acceptable level of purity, the mixture of alkaline wash liquid and lubricant is often subjected to a separation procedure (typically mechanical in nature), and the lubricant is recycled to be used in rolling step. The alkaline wash solution may also be further treated to remove residual oils or lubricants and then recycled.

Such typical procedures are not always completely satisfactory in nature. For instance, we have found that when using sodium hydroxide solutions for the removal of tallow from cold rolled steel plate, that fatty acids of the tallow are often produced. These fatty acids are quite troublesome in that they tend to concentrate in the alkali wash solution and cause substantial foaming. Although there are a variety of processes for separating animal fats from alkali rinse waters, we are not aware of any procedure for separating fatty acids from those solutions to prevent their foaming.

As will be discussed in more detail below, we utilize a chilling step on at least a portion of the alkaline rinse water to produce micelles of the fatty acid which then may be removed by filtration or other suitable means.

Typical procedures for treatment of rinse solutions are found below.

In U.S. Pat. No. 2,042,347, to Mackenzie, is found a procedure for continuously maintaining a chemical cleaning solution at its maximum operating efficiency. The procedure involves initially forming an aqueous alkaline solution by mixing predetermined quantities of water, water soluble alkaline detergent, and an emulsifying agent. This initial solution is then used to remove oil and the like from metals. Any oil which remains in the rinse solution is removed by skimming or use of an overflow weir.

U.S. Pat. No. 2,162,656, to Warrington, shows a procedure for removing oil and water emulsions from metal parts using a volatile solvent which further contains an agent facilitating removal of the soluble emulsions from the metal articles. In particular it uses solvents such as chlorinated hydrocarbons (trichloroethylene or perchloroethylene) or hydrogenated phenols. The metal part in question is emerged in a boiling bath of the liquid solvent to remove the oil and any water. The remaining parts are substantially degreased and are suitable for further treatment.

U.S. Pat. No. 3,973,987, to Hewitt et al., discloses a procedure for treating water which has been contaminated. A reverse osmosis procedure is used to purify the alkaline solution for further treatment and ultimate recycle to the process.

A procedure for the ultrafiltration or reverse osmosis treatment of emulsified oil-metal working coolants is found in U.S. Pat. No. 4,201,664, to Hekal. The procedure entails the withdrawal of rinse water or coolant from a drawing step for the production of two-piece cans. The coolant is said to be generally an oil-in-water emulsion of about 1–20% lubricating oil, about 0.1–20% of an emulsifying agent, and water. The rinse water containing this emulsion is fed to an ultrafiltration or reverse osmosis step in which the stream is fed under pressure to a device containing a semipermeable membrane adapted to separate high molecular weight organic compounds from the aqueous media. The water portion of the suspension passes through the semipermeable membrane and the permeate is recycled. No mention is made of further treating of the rinse water to remove any further contaminants.

A further process for regenerating and recycling aqueous degreasing or cleaning solutions contaminated with emulsified oils or animal fats is shown in U.S. Pat. No. 4,609,488, to Geke et al. In this procedure, alkaline or neutral cleaning solutions which are contaminated with various mineral or natural oils is regenerated by adding a cationic surfactant or cationic polymer as a demulsifier. The mixture is then separated (for example, by a separator or by an annular chamber deoiler) and the regenerated cleaning solution is returned for use. Although the use of defoaming agents is suggested, no other mention is made of ways to lower the foaming propensity of the recycle solution.

Although other processes are known for recycling rinse liquid, no specific method for separating oil from the cleaner solution other than by skimming is, however, suggested. See U.S. Pat. No. 4,602,963, to Piatkowski.

None of the processes disclosed in these documents suggests the use of a cooling step to remove fatty acids from slip stream of the rinse solution.

SUMMARY OF THE INVENTION

This invention is a procedure for removing fatty acids from aqueous streams containing fatty acids, animal tallows or greases, and, perhaps, solid detritus. The aqueous stream is used to remove excess tallow from formed metal objects which have undergone a metal-shaping step. The aqueous stream is typically recycled from a line tank which collects the aqueous spray after it has been sprayed onto the metal parts. A slipstream is taken from the line tank (often at elevated temperature) and sent to a process tank. From the process tank, the mixture of aqueous solution, typically containing sodium hydroxide, is sent to a gross filter where it is filtered to remove solid detritus. The filtered solution is then sent to an ultrafiltration or membrane separation unit which separates the animal fat or tallow from the aqueous solution. The permeate, i.e., the sodium hydroxide solution containing a modest amount of a surfactant and the offending fatty acids, is then sent to a cooling step where it is cooled to a temperature sufficiently low to allow the fatty acids to form globules or micelles and is then subjected to a fine filter. The filter removes the fatty acids from the aqueous solution, which solution is then recycled to the process for reuse in the metal-treating line.

DESCRIPTION OF THE INVENTION

Figure 1:
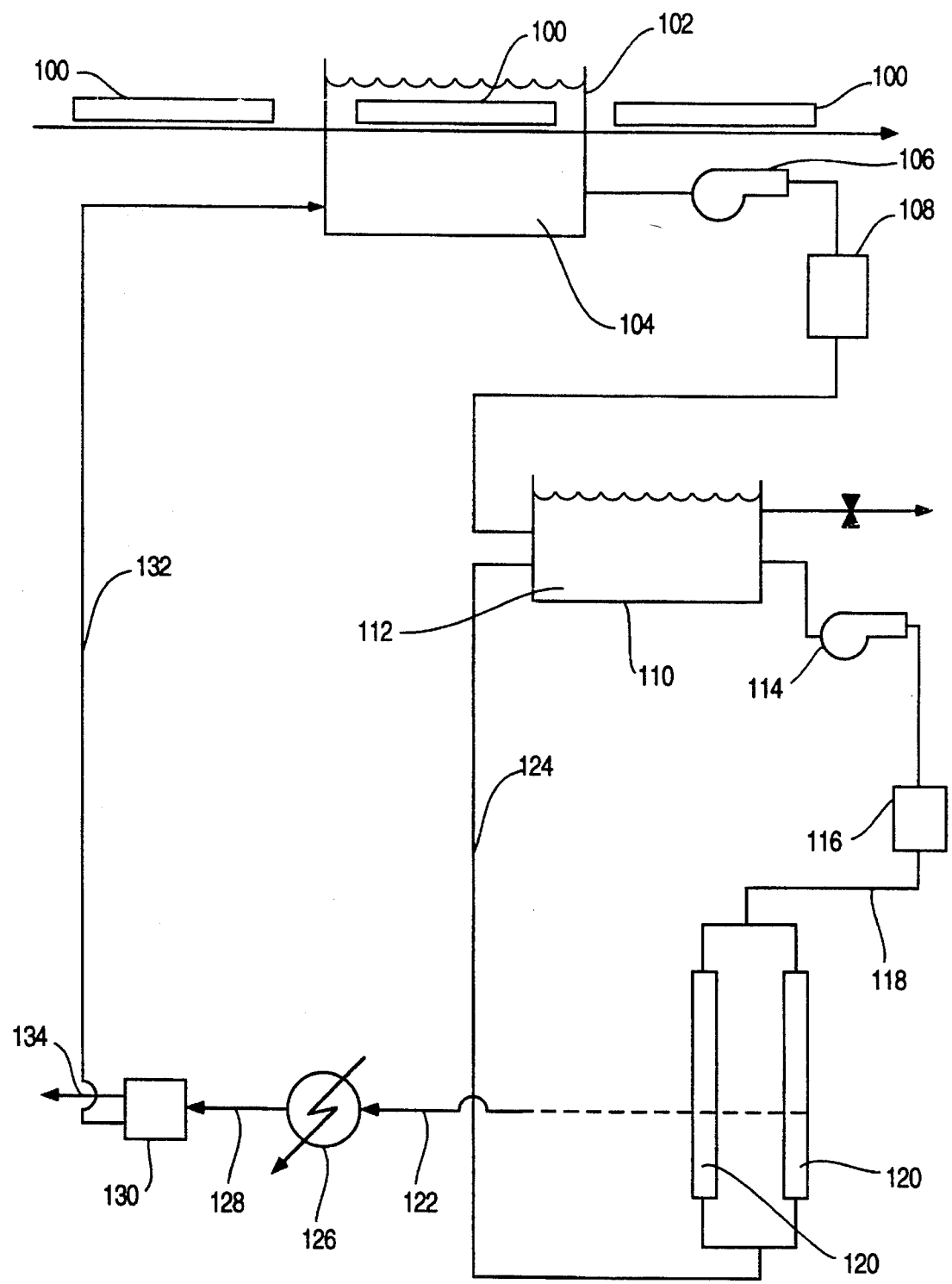
FIG. 1 is a schematic outline of one desirable procedure made according to the invention.

This procedure involves the cleaning of solutions used to rinse formed metal parts. As seen in FIG. 1, the formed metal parts (100) having lubricant therein, may be in a continuous sheet as might be found in a steel cold-rolling mill or in discrete parts as may be found in other forming operations, are passed through the rinsing step. The aqueous wash (104) may be sprayed or otherwise applied to the metal parts (100) to remove the lubricant and is thereafter accumulated in a line tank (102). The fluid (104) containing lubricant (and, often, other solid or dissolved impurities) is then sent via pump (106) often through a solids filter (108) to a holding tank (110). Typically the liquid material (112) in the holding tank is a "mousse" or highly integrated mixture of lubricant and the wash water. Some portion of the mixture (112) is then pumped via pump (114) to a second filter step (116). The optional second filtering step (116) removes larger solid particles from the aqueous stream and serves to protect the following ultrafiltration equipment. The filtered material (118) is then sent to a ultrafiltration step (120) which separates the wash liquid from any residual tallow. The ultrafiltration step (120) may be any of high-speed centrifugation or, preferably, a membrane separation step in which the filtered liquid (118) is applied at high pressure to one side of a membrane to separate the filtered liquid (118) into a permeate (122) which is an aqueous phase and a retentate liquid (124) which is returned to the process tank (110). Retentate (124) is largely tallow with some minor amount of dissolved water. The permeate (122) is largely water and often contains some surfactant used to assist the water in its removal of tallow from the formed metal parts and, in steel treating solutions, contains sodium hydroxide typically in the amount of 2–10% by weight. The permeate stream (122) is then subjected to a cooling step in heat exchanger (126). Typically for a steel-treating line, the liquids in the line tank (104), process or holding tank (110), and the following equipment are at a temperature between 150° F. and 200° F. The cooler (126) cools the permeate to a temperature of 70° to 150° F., perhaps 100° F. This temperature approaches that of cooling water found in warmer parts of the United States in the summertime. At those ranges, we have found that the residual fatty acids form micelles or globules which may be easily removed from the cooled aqueous stream (126) in filter (130). For other greases or fats, the temperature might need to be adjusted to some other appropriate level. The cooled and filtered aqueous rinse solution (132) may then be returned to the line tank (102). In some instances, it may be desirable to raise the temperature of the stream prior to its introduction into the line tank (102). The material removed (134) from the cooled stream (126) is then disposed of. For filters used on removing sheep tallow from sodium hydroxide solutions as may be used in cold-rolling steel sheet, the pore size in filter (130) may vary in effective diameter, e.g., between 1 and 50 microns, but for the concentrations and temperatures discussed above, we have found that a suitable diameter is 10 microns or less. The chosen filter size is dependent upon a variety of factors, but mainly is a function of the parameters of concentration of the materials removed from the stream and its temperature.

The terms and descriptions which have been used above are used only as terms of description and not of limitation. We have no intention of excluding equivalents of the features shown or described. It is recognized that one having ordinary skill in the art would readily perceive equivalents to the inventions claimed below which equivalents would be within the spirit of the invention expressed above.

I claim:

1. In a metal forming process in which tallow is used as a lubricant and alkaline water is used to rinse the tallow from formed metal surfaces, with used rinse water containing tallow and a minor amount of fatty acids, said rinse water being recycled using a purifying procedure comprising the steps of:

separating said used rinse water into a tallow stream and a fatty acid containing aqueous stream;

cooling said fatty acid containing aqueous stream to produce a fatty acid phase; and, separating said fatty acid phase from said aqueous stream.

2. The procedure of claim 1 wherein said rinse water is alkaline due to the presence of sodium hydroxide.

3. The procedure of claim 1 where the metal forming process is steel cold rolling.

4. The procedure of claim 1 where the cooling step results in a temperature of 70° to 150° F.

5. The procedure of claim 4 where the cooling step results in a temperature of no more than 100° F.

6. The procedure of claim 1 where the fatty acid phase is separated from the fatty acid containing aqueous stream by a microfilter.

7. The procedure of claim 6 where the pores of the microfilter are 1 to 50 microns in diameter.

8. The procedure of claim 6 where the pores of the microfilter are 10 microns or less in diameter.

9. The procedure of claim 1 where the step of separating tallow from the aqueous stream into a tallow stream and a fatty acid-containing aqueous stream takes place by ultrafiltration.

10. The procedure of claim 1 where the step of separating tallow from the aqueous stream into a tallow stream and a fatty acid-containing aqueous stream takes place by centrifugation.

* * * * *